Jan. 12, 1926.
H. R. HIGGINS
DUSTPROOF BEARING
Filed Nov. 20, 1922
1,569,751
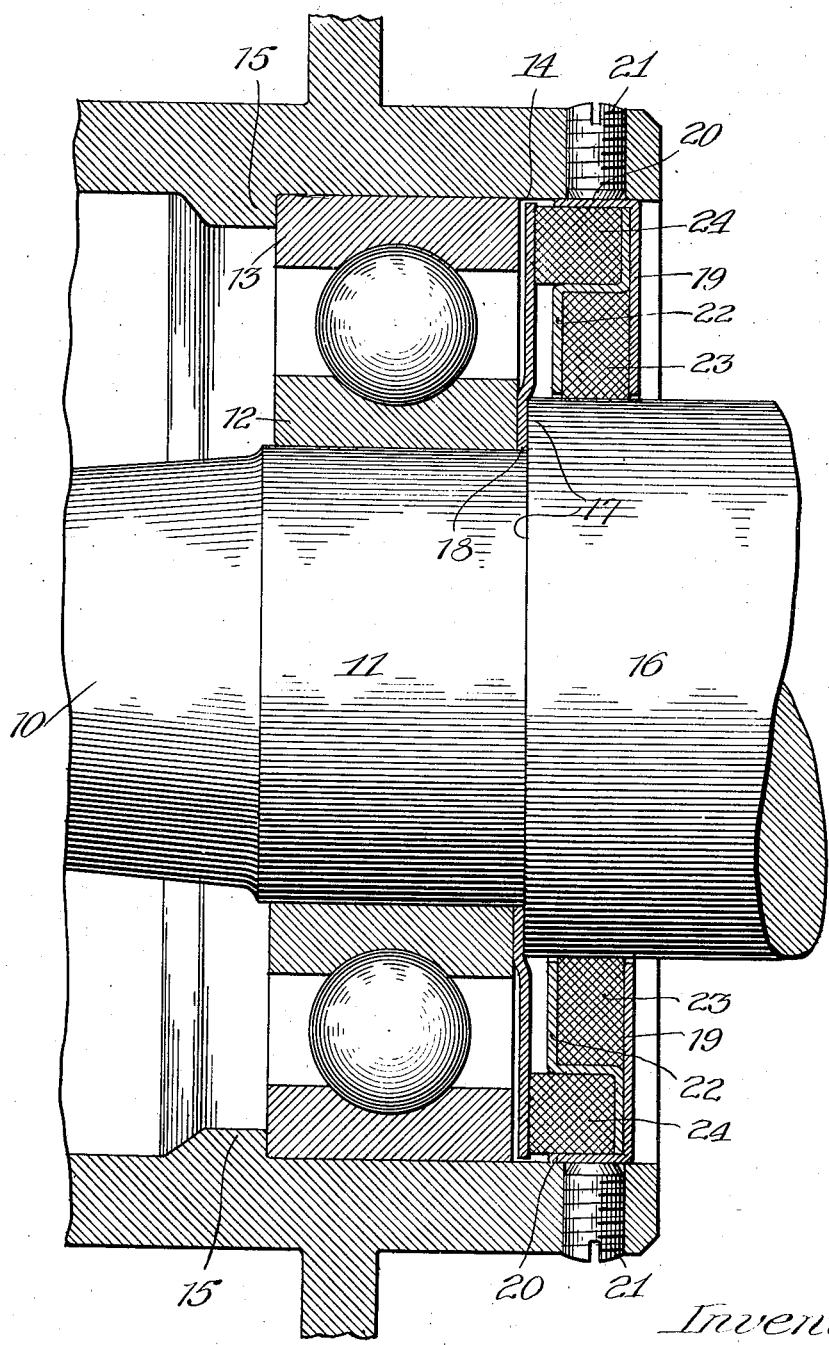
Inventor:
Howard R. Higgins Patented Jan. 12, 1926.

1,569,751

UNITED STATES PATENT OFFICE.

HOWARD R. HIGGINS, OF GLEN ELLYN, ILLINOIS, ASSIGNOR, BY MESNE ASSIGNMENTS, TO MARLIN-ROCKWELL CORPORATION, OF JAMESTOWN, NEW YORK, A CORPORATION OF NEW YORK.

DUSTPROOF BEARING.

Application filed November 20, 1922. Serial No. 602,009.

*To all whom it may concern:*

Be it known that I, HOWARD R. HIGGINS, a citizen of the United States, residing at Glen Ellyn, in the county of Du Page and State of Illinois, have invented a new and useful Improvement in Dustproof Bearings, of which the following is a specification.

This invention relates to dust-proof bearings and the like and is fully described in the following specification and shown in the accompanying drawing, in which the Figure shows a partial longitudinal section through a bearing embodying the invention.

In the embodiment illustrated, the bearing is mounted on an axle 10 having a slightly enlarged cylindrical portion 11 upon which is fitted, in the usual manner, the inner race member 12 of a combined radial and thrust ball bearing, the outer race member 13 of which is mounted in a bore 14 and normally held against a shoulder 15 by an outer ball bearing (not shown), which may be mounted in any well known manner.

An enlarged cylindrical portion 16 is formed inside of the cylinderical portion 11, which is separated therefrom by a shoulder 17. A plate 18 is held between this shoulder 17 and the inner race member 12.

An annular member 19 has a cylindrical portion 20, which is snugly fitted into the bore 14 and, if desired, may be locked therein by means of screws 21. A plate 22, preferably of Z-shaped cross section, lies loosely within the cylindrical portion 20 forming an annular pocket in which the felt washer 23 is held.

Another felt washer 24 of larger diameter is concentric with the axle 10 and lies between the cylindrical portion 20 and the cylindrical portion of the Z-shaped plate 22. This felt washer bears against the plate 18, thereby forming a seal which, together with the seal formed between the felt washer 23 and the cylindrical portion 16 of the axle 10, prevents oil within the bearing from working out and at the same time prevents dust on the outside from getting into the bearing. The screws 21 permit of the take-up and adjustment of the pressure between the washer 24 and the plate 18 as wear occurs.

While I have shown and described certain embodiments of my invention, it is to be understood that it is capable of many modifications. Changes, therefore, in the construction and arrangement may be made without departing from the spirit and scope of the invention as disclosed in the appended claims, in which it is my intention to claim all novelty inherent in my invention as broadly as possible in view of the prior art.

What I claim as new and desire to secure by Letters Patent, is:

1. In combination, an axle having a cylindrical surface at the inner end, a wheel journaled thereon, a portion of said wheel surrounding said cylindrical surface, a felt washer adapted to slidably surround said cylindrical surface, a cylindrical bore within said portion, an anti-friction bearing having inner and outer race members, the outer race member being fitted within said bore, the inner race member being fitted upon said axle, an annular member snugly fitting within said bore and acting as a closure for the outer race member, said annular member retaining said felt washer, and means yieldably holding said felt washer outwardly against said annular member.

2. In combination, an axle having a cylindrical surface at the inner end, a wheel journaled thereon, a portion of said wheel surrounding said cylindrical surface, a felt washer adapted to surround said cylindrical surface, a cylindrical bore within said portion, an anti-friction bearing having inner and outer race members, the outer race member being fitted within said bore, the inner race member being fitted upon said axle, an annular member snugly fitting within said bore and acting as a closure for the space between the bore and axle, said annular member retaining said felt washer, a plate of Z-shaped cross-section enclosing the circumference and one end of the felt washer, a second felt washer lying outside the first mentioned felt washer and separated therefrom by said plate of Z-shaped cross-section, and a plate carried by said axle bearing against said second felt washer.

3. In combination, an axle having a cylindrical surface at the inner end, a wheel journaled thereon, a portion of said wheel surrounding said cylindrical surface, a felt washer adapted to slidably surround said cylindrical surface, a cylindrical bore within said portion, an anti-friction bearing having inner and outer race members, the outer race member being fitted within said bore, the inner race member being fitted upon said axle, an annular member snugly fitting within said bore, a second felt washer outside the first mentioned felt washer and separated therefrom by a curved plate, a plate carried by said axle and bearing against said second felt washer, and additional means for retaining said annular member within said bore.

4. In combination, an axle having a cylindrical surface, a wheel journalled on said axle, a portion of said wheel surrounding said cylindrical surface, a substantially plane surface adjacent said cylindrical surface and perpendicular thereto and affixed to said axle, a member carried by said wheel and felt washers carried by said member and having sliding bearing upon said cylindrical surface of the axle and plane surface to prevent dust from entering the bearing.

HOWARD R. HIGGINS.